May 22, 1934.  D. G. MAGILL  1,959,378
OPENING DEVICE
Filed Feb. 20, 1931
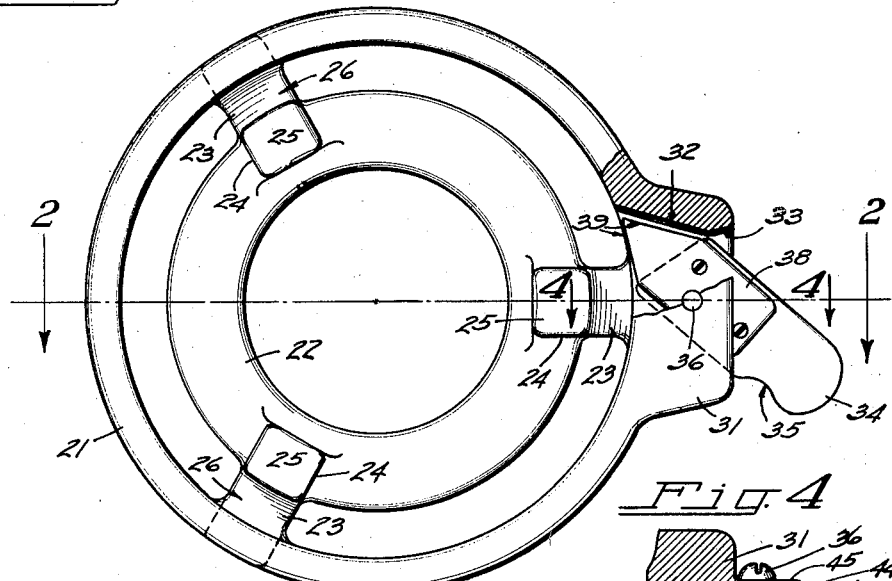
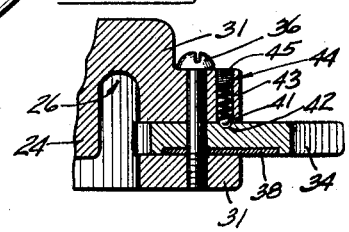
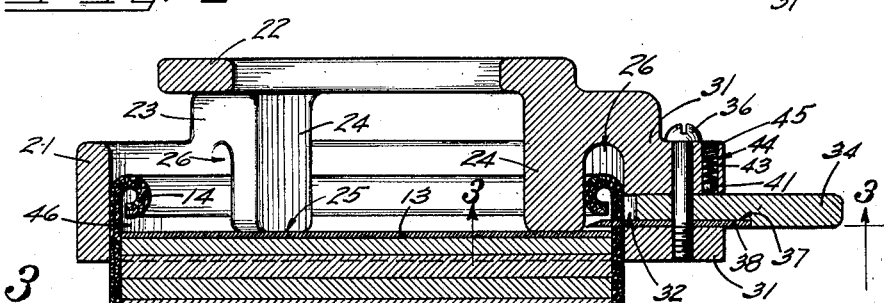
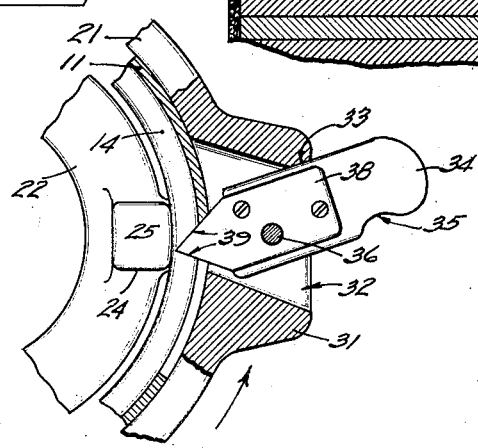
INVENTOR
BY Donald G. Magill
John C. Carpenter
ATTORNEY Patented May 22, 1934

1,959,378

UNITED STATES PATENT OFFICE 1,959,378

OPENING DEVICE

Donald G. Magill, Winnetka, Ill., assignor to American Can Company, New York, N. Y., a corporation of New Jersey Application February 20, 1931, Serial No. 517,249

8 Claims. (Cl. 30—3)

The present invention relates to a hand tool for cutting a fibre tube container and has particular reference to a tool for completely severing the end from the container to gain access to its contents.

The principal object of the present invention is the provision of a hand tool adapted to fit over and sever the closed end of a fibre tube container during rotation between the tool and the container.

An important object of the invention is the provision of a hand tool for severing the closed end of a fibre tube container, said tool having a detachable and replaceable cutting element.

An important object of the invention is the provision of a hand tool for severing and guiding the closed end of a fibre tube container while holding its closure head spaced from the end of the tube to present a proper cutting surface to the cutting element.

An important object of the invention is the provision of a hand tool for severing the closed end of a fibre tube container during rotation therebetween, the cutting element being held in cutting position throughout such severing operation, provision being made for also holding such cutting element in inoperative and protected position when not in use.

The invention contemplates the utilization of a cutting element adapted for cutting engagement with the end of the tube container being severed, by a simple manipulation of the element accompanied by a rotation of the tool relative to the tube container.

Numerous other objects of the invention will be apparent as it is better understood from the following description, which, taken in connection with the accompanying drawing discloses a preferred embodiment thereof.

Referring to the drawing:

Figure 1 is a bottom plan view of a cutting tool embodying the present invention, parts being broken away;

Fig. 2 is a transverse sectional view taken substantially along the line 2—2 in Fig. 1, showing the tool applied to a tube container and the cutting element in cutting position;

Fig. 3 is a fragmentary sectional view taken substantially along the line 3—3 in Fig. 2, looking upward; and Fig. 4 is a fragmentary transverse sectional view taken substantially along the line 4—4 in Fig. 1.

The tool, disclosed in the drawing as exemplifying the present invention, is adapted to be manually operated and to sever one end of a tube container, formed of fibre or other suitable material, in order to gain access to its contents. Such a container may be closed at its ends in any suitable manner as by inwardly curling the edges of the side walls over the cover to confine its contents in place.

Such a container comprises a tubular body 11 adapted to hold contents which are herein illustrated as disc-like articles 12, such as can ends or other can parts, and a head or cover member 13 is provided to hold the contents therein. The end of the tubular body 11 is curled inwardly and downwardly in a curl or bead or rim 14, which engages the top of the cover member and prevents its outward displacement.

A preferred form of tool comprises an annular body 21 adapted to fit around the outside periphery of the container. An annular hand grip 22 is formed integrally with the tool body 21 and is held in spaced relationship by means of webs 23. Three webs 23 are illustrated but it will be understood that any number may be used depending upon the size of the tool. The annular member 22 projects downwardly adjacent each web 23 and within the confines of the tool body, forming depending lugs 24 having smooth bottom surfaces 25. Channels 26 to receive the top rim of the container are thus formed beneath each web 23 and between each lug and the inside surface of the tool body.

The tool body, opposite one of the depending lugs 24, projects outwardly to form a boss 31, which is horizontally slotted to provide a chamber 32. One of the vertical end walls of the chamber is beveled at 33 to provide a stop for a cutting element. This cutting element comprises a handle member 34 having a finger notch 35 formed in one of its longitudinal edges and is pivotally mounted for movement within the chamber 32 on a screw 36 threadedly engaged within the lower wall of the boss 31.

The handle member 34 is recessed at 37 on its under side to provide a seat for a cutter blade 38 detachably held in place by screws. One end of the blade 38 extends beyond the handle member 34 and is V-shaped or pointed to provide cutting edges 39 which are further beveled to increase their cutting effect. This detachable mounting of the blade on the handle member and the mounting of the latter within the tool body permit ready removal and replacement of the cutting elements for sharpening and other purposes.

A detent or locking device is provided for holding the cutter 38 in non-cutting or inoperative position which comprises a ball 41 resting, when in locked position, (Fig. 4) within a socket 42 formed in the upper face of the handle member, a spring 43 carried in a bore 44 located in the upper part of the boss 31 providing the proper yielding element for the ball. A setscrew 45 threadedly engaged in the upper end of the bore 44 is used to compress the spring to the desired pressure. In its protected position the cutting edges of the cutter 38 are confined entirely within the chamber 32 as shown in Fig. 1.

In operation, the tool is placed over the end of the container with the curl 14 in the channels 26, and the bottom surfaces 25 of the lugs 24 resting upon the cover member 13. A downward pressure on the tool then forces the cover member 13 downwardly and against the contents 12 in the container, which yields slightly to provide an annular space 46 between the lower edge of the curl 14 and the upper surface of the member 13 as shown in Fig. 2. The chamber 32 with its cutter 38 is located in a plane above the faces 25 of the lugs 24 and when the contents are thus compressed the cutter is in horizontal alignment with the annular space 46 and clear of both the curl 14 and the cover member 13.

The tool is then manually rotated in a direction indicated by the arrow in Fig. 3. Simultaneously with this rotation the handle member 34 is turned on its pivot, by engagement with the finger notch 35 to bring the pointed end of the cutter blade 38 into engagement with the container body wall. The point of the cutter thereupon pierces the container wall and enters into the open space 46 between the curl 14 and the cover member 13. Continued rotation of the tool further moves the handle member on its pivot until stopped by the wall 33 after which the handle and cutter are held in operating position until the curled end of the container is entirely severed by the complete rotation of the tool relative to the container.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A hand tool for severing the end of a fibre tube container, comprising in combination, a tool body adapted to extend all around the outside of a container and to receive the end of said container and to be guided by it during the severing operation, a cutter associated with said tool body and operating to sever the end of said container during relative rotation between it and the said tool, and means rotating with the cutter and carried by said tool body for holding the contents of said container away from the end thereof to provide a cutting space for said cutter.

2. A hand tool for severing the end of a fibre tube container, comprising in combination, a tool body adapted to receive the end of said container and to be guided by it during the severing operation, a plurality of lugs carried by said tool body for holding the contents of said container away from the end thereof, said body and lugs being adapted to rotate as a unit on the container, a cutter associated with said tool body for severing the end of said container during relative rotation between it and the said tool, said severing taking place at a predetermined position relative to the under faces of the said lugs.

3. A hand tool for severing the curled end of a fibre tube container, comprising in combination, a tool body adapted to receive the end of said container for a severing operation, a plurality of lugs carried by said tool body for holding the contents of said container spaced from the plane of cutting thereof, and a cutter associated with said tool body adjacent one of said lugs and operating to sever the curled end of said container during relative rotation between it and the said tool, said lug forming a backing for said cutter by engaging within the curled end of the inner container wall.

4. A hand tool for severing the end of a fibre tube container, comprising in combination, a tool body adapted to receive the end of said container for a severing operation, a cutter pivotally mounted in said tool body and having an operating and an inoperating position, said body having a lug near the cutter and located within the container rim when in operation, and means for locking said cutter in its inoperating position.

5. A hand tool for severing the end of a fibre tube container, comprising in combination, a tool body adapted to receive the end of said container and guide it during the severing operation, a chamber formed in said tool body, a cutter pivotally mounted in said chamber and operating while in one position to sever the end of said container during relative rotation between it and the said tool, and means for holding said cutter enclosed within said chamber in a protected and inoperative position.

6. A hand tool for severing the end of a fibre tube container, comprising in combination, a tool body adapted to receive the end of said container for a severing operation, a chamber formed in said tool body, a cutter mounted in and extending outside of said chamber to sever the end of said container during relative rotation between it and the said tool, and stop means located within said chamber for holding the said cutter in extended position.

7. A hand tool for cutting off the curled end of a container having a fibre body and a depressible cover held under the curl, comprising in combination a tool body having means whereby it is centered on said curled edge, said body having means to depress the cover, and a cutter held on said tool body at the outside of the container body and at a point above the cover when the latter is depressed, the tool being turnable with said cutter around the container body.

8. A hand tool for severing the end of a fiber tube container, comprising in combination: a tool body in the form of a ring to extend around the exterior of a container and having parts rigid with the ring which are adapted to rest on the rim of the container and to extend downwardly on the inner side of the rim to center and guide the tool body and brace the rim during relative rotation between the same and the tool body during the severing operation, and a cutter associated with said tool body on the outside of the rim and operating towards said downwardly extending parts to sever the end of said container during relative rotation between the container and the said tool.

DONALD G. MAGILL.